United States Patent [19]
Eriksson et al.

[11] Patent Number: 5,641,252
[45] Date of Patent: Jun. 24, 1997

[54] METHOD FOR PRODUCING HOLES IN FIBRE REINFORCED COMPOSITES

[75] Inventors: Ingvar Eriksson, Stockholm; Jan Bäcklund, Lidingö ; Leif Zackrisson, Stockholm, all of Sweden

[73] Assignee: Novator AB, Stockholm, Sweden

[21] Appl. No.: 436,401

[22] PCT Filed: Nov. 17, 1993

[86] PCT No.: PCT/SE93/00987

§ 371 Date: Jun. 23, 1995

§ 102(e) Date: Jun. 23, 1995

[87] PCT Pub. No.: WO94/11142

PCT Pub. Date: May 26, 1994

[30] Foreign Application Priority Data

Nov. 19, 1992 [SE] Sweden .................................. 9203493

[51] Int. Cl.⁶ ...................................................... B23C 3/00
[52] U.S. Cl. ........................... 409/132; 408/1 R; 451/28
[58] Field of Search ........................... 409/131, 132, 409/557; 408/1 R, 229, 228, 145; 451/36, 28; 407/53, 1, 54

[56] References Cited

U.S. PATENT DOCUMENTS

| | | | |
|---|---|---|---|
| 4,190,386 | 2/1980 | Brabetz et al. | 408/1 R |
| 4,338,050 | 7/1982 | Ozer et al. | 408/1 R |
| 4,449,865 | 5/1984 | Yankovoy et al. | 408/1 R |
| 4,480,949 | 11/1984 | van de Bogart | 407/54 |
| 4,480,952 | 11/1984 | Jeremias | 408/1 R X |
| 4,483,108 | 11/1984 | Howard | 408/1 R |
| 4,519,732 | 5/1985 | Sutcliffe | 408/1 R |
| 4,680,897 | 7/1987 | Daniels | 451/28 X |
| 4,757,645 | 7/1988 | Ozer et al. | 51/206 R |
| 4,800,686 | 1/1989 | Hirabayashi et al. | 408/1 R |
| 5,226,760 | 7/1993 | Nishimura | 407/54 |

FOREIGN PATENT DOCUMENTS

| | | | |
|---|---|---|---|
| 352224A1 | 1/1990 | European Pat. Off. | B23B 51/08 |
| 59-98015 | 12/1985 | Japan | B23B 51/06 |
| 2048135 | 12/1980 | United Kingdom | B23B 41/04 |

Primary Examiner—William R. Briggs
Attorney, Agent, or Firm—Taylor & Associates, P.C.

[57] ABSTRACT

The invention relates to a method for producing a hole in a workpiece consisting of a fibre-reinforced composite material. The central axis of the hole passes through a predetermined point on the surface of the workpiece and is oriented in a certain determined direction in relation to the longitudinal directions of the fibres in the immediate vicinity of the point. The material is machined simultaneously in both an axial and a radial sense by causing the tool to describe an axial motion and to rotate not only about its own axis (5), but also eccentrically about the central axis.

10 Claims, 3 Drawing Sheets

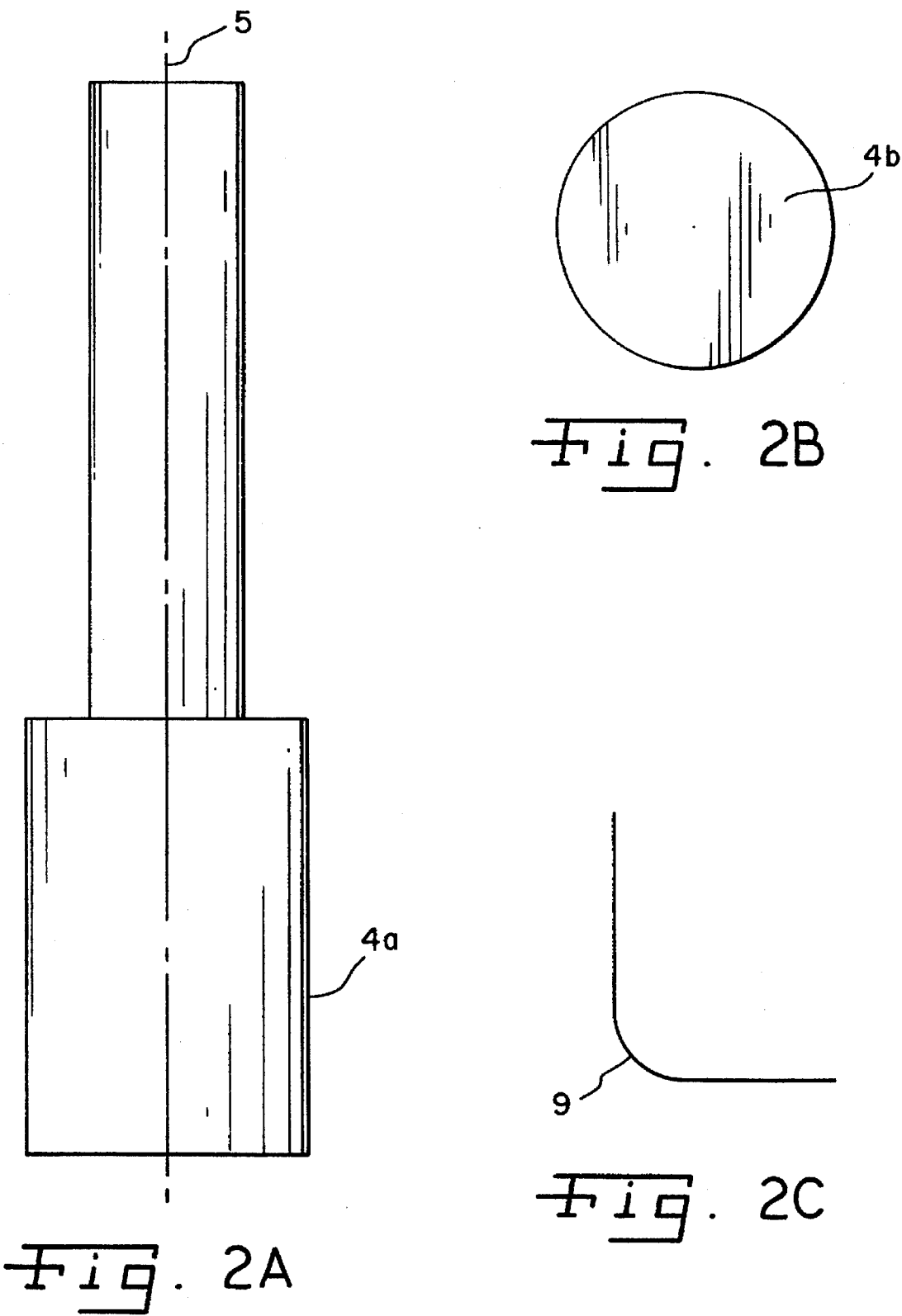

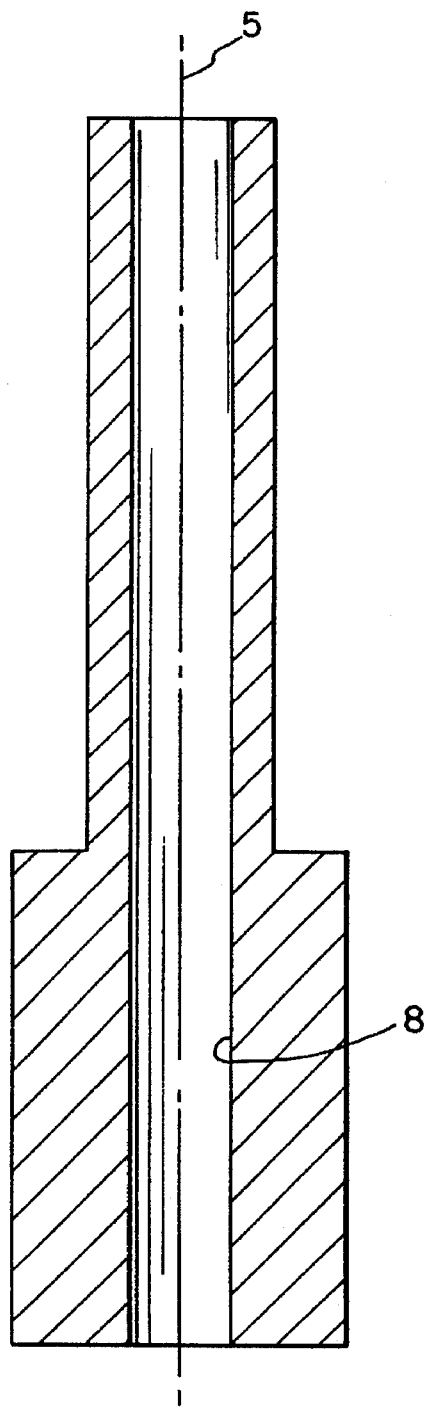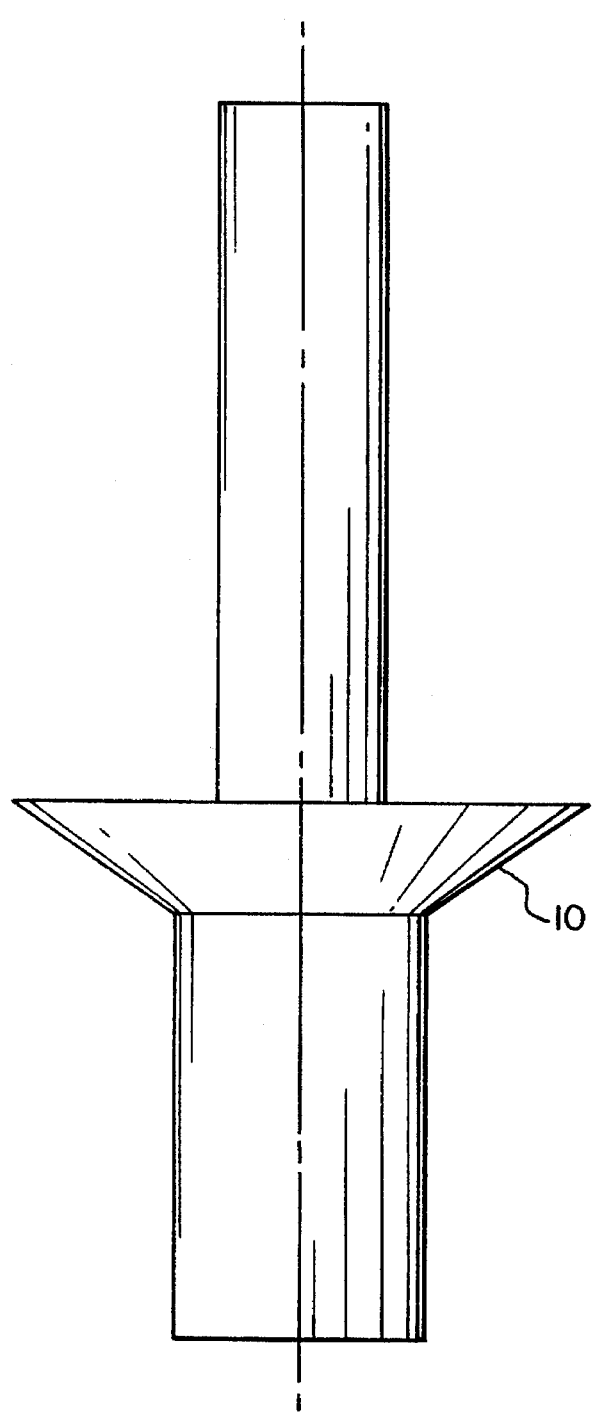
Fig. 2D
Fig. 2E

METHOD FOR PRODUCING HOLES IN FIBRE REINFORCED COMPOSITES

BACKGROUND OF THE INVENTION

1. Field of the Invention

The present invention relates to a cutting tool and method for producing a hole in a workpiece consisting of a fibre-reinforced composite material, the central axis of which passes through a predetermined point on the surface of the workpiece and is oriented in a certain determined direction in relation to the longitudinal directions of the fibres in the immediate vicinity of the point.

2. Description of the Related Art

Polymer composite materials have been generally known since the 1950's. These materials are composed of a protective and binding polymer, either a thermoplastic or a thermosetting plastic, usually referred to as the matrix, together with fibres (e.g. glass, carbon or amide fibres), which may be regarded as a reinforcing material. The fibres may be continuous and oriented in specific directions, or they may be relatively short and arranged at random in the matrix. Composites with continuous and oriented fibres give products with mechanical properties superior to those of conventional polymer and metallic materials, especially as far as their weight-related strength and rigidity are concerned. Composites with shorter fibres find an application where rather less demanding properties are called for. One factor obstructing the wider use of composite materials is the absence of effective methods of cutting machining. The physical and chemical properties of the composite materials mean that known machining methods cannot generally be applied with successful results.

Products consisting of composite material often contain holes for various purposes. These holes may be required, for instance, to permit the laying of service lines, assembly or inspection. Bolt holes are a particularly important category of hole. Structures for practical applications are often constructed from components joined together to produce a finished product. The purpose of the joint is to transfer the load from one structural element to another. One common form of jointing is the bolted connection, in which the load is transferred by either shearing loads or tensile loads in the bolt. The strength of a bolted connection is influenced to a considerable degree by the quality and precision of the hole. Reference may be made to three particular problem areas when producing holes in polymer composite materials:

Low interlaminar strength.

When machining laminated composite materials, there is a risk of the layers separating (delaminating) because of the low interlaminar strength. Extensive delamination damage can jeopardize the strength of the laminate.

Low resistance to heat and cold of certain thermoplastics.

The heat generated during machining can cause the matrix to soften and block the tool, making further machining impossible. In order to achieve good hole quality, it is accordingly necessary to provide effective cooling of the tool/hole edge, and for the material removed by cutting (chips, splinters and grinding dust) to be removed continuously from the hole.

High wear resistance of fibres.

The cutting machining of the fibre composites causes severe wear of the tool because of the good wear characteristics of the fibre materials. This leads to high wear costs, especially when producing holes with a requirement for high precision.

The methods used to produce holes in composite laminates are traditional boring, milling, sawing and grinding.

The problem associated with these hole-forming methods as they are applied at the present time is that they are not sufficiently effective for various reasons from a technical/economic point of view.

High wear costs are a general problem associated with cutting machining where high precision is required. Great care must be taken when boring to ensure that delamination damage is avoided on both the entry and exit sides. Special cutters are required in order to achieve the stipulated hole quality, and special procedures must be formulated. In order to avoid extensive delamination damage on the exit side of the laminate, local lateral pressure must be applied around the edge of the hole. Another previously disclosed method of protecting the exit side from damage is to provide the laminate with an additional protective layer.

Sawing is a distinctly unsuitable method for producing holes with high precision requirements. When producing holes by grinding, use is made of a cylindrically shaped tubular body, the machining end of which is coated with a wear-resistant surface layer. Holes are produced by grinding the surface of the material transversely while first causing the grinding body to rotate. The method is slow and gives low precision.

Also disclosed through Swedish Patent Application 9201420-8 is a method for forming damage-free holes in fibre-reinforced material by reaming out a pre-formed hole, in conjunction with which the axis of rotation of a grinding body is oriented orthogonally to the longitudinal direction of the fibres at the edge of the hole. The proposed method also differs from previously disclosed surface-modifying hole machining methods in that the volume of material removed by cutting is considerably greater. In the case of hole forming by the radial removal of material, the volume of material removed by cutting is proportional to the change in radius before and after machining. In the case of traditional, surface-modifying machining, the profile depth of the edge of the hole provides a characteristic measure of this change in radius. When machining by the proposed method, the radial extent of any damage defines a lower limit for the difference in radius before and after machining. This lower limit is generally considerably greater than the profile depth of the edge of the hole. It will be appreciated from the foregoing that the size of the pre-formed hole differs significantly compared with the pre-formed hole. A production economic weakness associated with this method is the fact that the presence of a pre-formed hole is required.

It should be pointed out in this respect that hole-machining methods, in which a body driven rotatably about an axis of rotation is also caused to execute an orbital motion (i.e., the axis of rotation is displaced in such a way that the side is able to move relative to the edge of the hole), are generally familiar. SE 173 899 discloses a machine tool having a tool carrier rotating eccentrically about a principal axis, in which the distance between the tool carrier and the principal axis is adjustable. Adjustment of the distance between the tool carrier and the principal axis utilizes a guide components, which rotates about the principal axis together with the tool carrier. The guide component rotating together with the tool carrier is arranged perpendicular to the principal axis and is executed as a cam capable of rotating about it in relation to the tool holder, with the guiding profile of which cam the tool holder is in direct engagement. The advantages of this invention include, among other things, the absence of free play and the space-saving execution of the guide component. SE 382 506 discloses a rotatably driven, combined cutting tool for making holes in stationary workpieces, which holes can be provided with a conical starting chamfer.

Further examples of the prior art are provided by U.S. Pat. Nos. 4,190,386; 4,338,050; and 4,757,645, which describe methods of producing holes in composite materials, and by GBA-2048 135, which discloses a method of machining a pre-formed hole to the desired size/geometry.

SUMMARY OF THE INVENTION

The object of the proposed invention is to eliminate the shortcomings and limitations associated with previously disclosed methods, and to permit the rational and cost-effective production of holes, free from strength-reducing damage, and, in so doing, to guarantee repeatably good hole quality. This is achieved in accordance with the present invention in that at least one cutting tool with a wear-resistant surface is positioned eccentrically in relation to the aforementioned central axis, and in that the material is machined simultaneously in both an axial and a radial sense by causing the tool to describe an axial motion and to rotate not only about its own axis, but also eccentrically about the central axis.

In accordance with one particular characterizing feature of the invention, the workpiece or the tool is oriented in such a way that the axis of rotation of the tool is essentially orthogonal in relation to the longitudinal directions of the fibres in the immediate vicinity of the aforementioned point, and that the diameter of the tool is substantially smaller than the diameter of the hole that is produced.

The eccentric rotary motion is preferably a strictly rotary motion, i.e., it is executed with a constant distance between the central axis and the axis of rotation of the tool.

The eccentric rotary motion is preferably executed with linear increments, i.e., with varying distances between the central axis and the axis of rotation of the tool.

The method exhibits a number of substantial advantages compared with generally familiar techniques:

1. The method permits the production of holes without strength-reducing damage.
2. The method permits the production of holes free from damage without first having to pre-form a hole.
3. The method permits the production of holes to tight tolerances. The dimensional accuracy of the hole is determined substantially by the accuracy of positioning the tool relative to a central axis. The requirements imposed on the geometry of the tool are not particularly high, on the other hand, since every individual tool is simply calibrated before use.
4. The method reduces the risk of the tool becoming blocked. Since the diameter of the tool is substantially smaller than that of the hole, the method permits material removed by cutting to be carried away by simple means, for example with compressed air. The method also permits effective cooling of the tool and the edge of the hole.
5. The method substantially reduces the cost of wear compared with previously disclosed methods, thanks to the ability to coat the tool with a wear-resistant material, for instance a diamond coating.

A tool for the execution of the method in accordance with the invention includes a tool which exhibits a radius between its cylindrical cutting surface and its substantially plane cutting surface arranged orthogonally to the axis of the tool. The tool preferably has an axial channel so arranged as to communicate with a source of negative pressure or a source of coolant.

BRIEF DESCRIPTION OF THE DRAWINGS

The invention is described below in more detail with reference to the accompanying drawings, wherein:

FIG. 1b shows a section through the sheet in FIG. 1a;

FIG. 1c shows how a hole is produced in the sheet in accordance with FIG. 1a;

FIGS. 2a and 2b are a schematic representation in plan view, seen respectively from the side and from below, of a tool for executing the method in accordance with the invention;

FIG. 2c is a detailed view of how the tool in accordance with FIG. 2a was formed with a radius between the cylindrical machining surface and the plane machining surface lying perpendicular to it;

FIG. 2d shows a tool with an axial channel; and

FIG. 2e shows a tool by means of which a countersinking can be formed simultaneously with the production of a hole.

DETAILED DESCRIPTION OF THE INVENTION

Figure 1A:
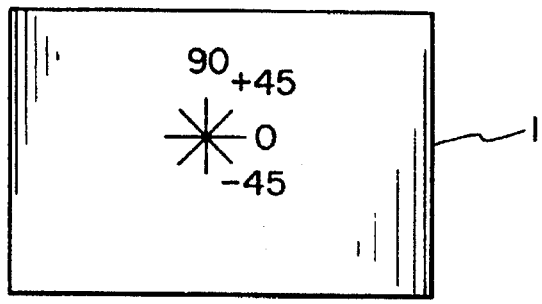
FIG. 1a shows a sheet of fibre-reinforced composite material with the principal directions of the reinforcing fibres marked.
Figure 1B:
Figure 1C:
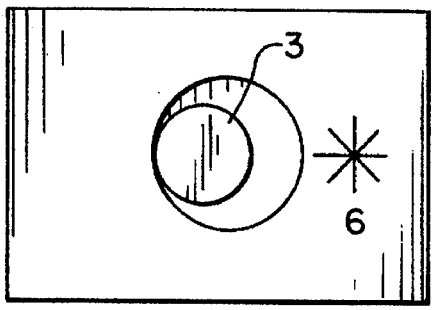
Figure 1D:
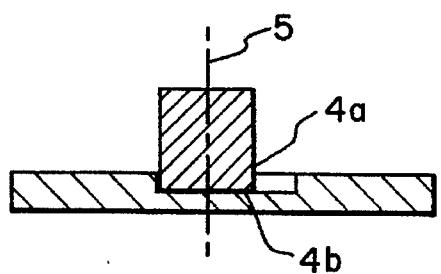
FIG. 1d shows FIG. 1c as a sectional view.

Referring now to the drawings, a plate 1 (a laminate) is built up from a number of lamellae (layers) 2 with continuous fibres, which lamellae are stacked one on top of the other. In the illustrative example, the fibres lie oriented in planes parallel with the plane of the laminate. The directions of the fibres (0, 90, +45 and −45 degrees) are illustrated schematically in FIG. 1.

A hole is produced by positioning at least one cutting tool 3 with a radial and an axial machining surface 4a, 4b eccentrically in relation to the central axis of the envisaged hole. In conjunction with this, the laminate is oriented in such a way that the axis of rotation 5 of the tool is orthogonal to the essential longitudinal directions of the fibres. The material is machined in an axial and a radial sense by causing the tool to execute an axial motion and to rotate not only about its own axis, but also eccentrically about the central axis.

The tool in accordance with FIGS. 2a, 2b is primarily intended for the production of cylindrical holes by the method in accordance with the invention.

By providing the tool with a radius, as illustrated in FIG. 2c, at the transition between the respective axial and radial machining surfaces, the contact pressure is reduced locally, which increases the service life of the tool.

Illustrated schematically in FIG. 2d is a tool for executing the method in accordance with the invention, which has an axial channel 8. By causing this channel to communicate with a source of coolant, any heat generated in the course of the cutting machining of the composite material can be conducted away by cooling. Alternatively, the channel may be utilized for leading away any composite material removed by cutting, in which case the channel 8 is connected to a source of negative pressure. The quantity of material to be removed by cutting is also reduced through the channel.

FIG. 2e illustrates as an example a tool by means of which countersinking of the hole can be performed at the same time as the hole is being produced. The tool is provided for this purpose with a cone-shaped part 10, the front rake angle of which is selected having regard for the inclination of the countersinking.

We claim:

1. A method of producing a hole in a fiber reinforced composite material workpiece, wherein the hole has a longitudinal axis which passes through a predetermined point on the surface of the workpiece and is oriented in a determined direction relative to longitudinal directions of the fibers in the workpiece, said method comprising the steps of:

provinding a cutting tool having a wear-resistant surface and an axis of rotation, the cutting tool also having a diameter which is substantially smaller than the diameter of the hole that is produced;

positioning the cutting tool eccentrically relative to the longitudinal axis of the hole, wherein the axis of rotation of the cutting tool is substantially orthogonal to the longitudinal directions of the fibers; and simultaneously machining the workpiece in both an axial and a radial direction relative to the longitudinal axis of the hole, by simultaneously rotating the cutting tool around the axis of rotation, moving the cutting tool in an axial direction, and moving the cutting tool eccentrically around the longitudinal axis of the hole.

2. The method of claim 1, wherein the eccentric movement of the cutting tool comprises strictly rotary motion in which a substantially constant distance is maintained between the longitudinal axis of the hole and the axis of rotation of the cutting tool.

3. The method of claim 1, wherein the eccentric movement of the cutting tool comprises stepwise linear movements in which varying distances occur between the longitudinal axis of the hole and the axis of rotation of the cutting tool.

4. The method of claim 1, wherein said cutting tool comprises a grinding tool.

5. The method of claim 1, wherein said cutting tool comprises a milling tool.

6. The method of claim 1, wherein said cutting tool comprises a boring tool.

7. The method of claim 1, wherein said cutting tool includes an axial channel.

8. The method of claim 7, comprising the further step of supplying coolant fluid through said axial channel during said machining step.

9. The method of claim 7, comprising the further step of removing machined material from the workpiece through said axial channel during said machining step.

10. The method of claim 1, comprising the further step of countersinking an edge of the hole, simultaneously with said machining step.

* * * * *